Patented Feb. 11, 1941

2,231,363

UNITED STATES PATENT OFFICE 2,231,363

PREPARATION OF ALPHA-CHLORACRYLONITRILE

John R. Long, Akron, Ohio, assignor to Wingfoot Corporation, Wilmington, Del., a corporation of Delaware No Drawing. Application March 15, 1940, Serial No. 324,147

4 Claims. (Cl. 260—464)

This invention relates to a method for the preparation of alpha-chloracrylonitrile, an unsaturated substance having use in the formation of polymerized materials.

Thus, direct chlorination of vinylcyanide or acrylonitrile in solution does not yield the alpha chlorinated compound but, instead, tends to produce beta chloropropionitrile and trichloropropionitrile. In accordance with the present invention, chlorination is conducted in the vapor phase, the chlorine and the acrylonitrile being passed together over a catalyst, such as active carbon, at a sufficiently high temperature to cause substitution of chlorine on the carbon atom but not so high as to cause decomposition and carbonization. Temperatures between about 200° C. and 550° C. have been found to be effective and even higher temperatures may be employed if higher rates of flow are maintained. Generally, a temperature from 230° to 450° C. is preferred. In addition, it has been observed that the presence of active carbon, or equivalent contact catalyst, is necessary in order to obtain satisfactory yields. The process is about 40% effective in producing alpha-chloracrylonitrile, the substances beta-chlorpropionitrile and alpha, alpha, beta-trichlorpropionitrile also being produced.

The process is illustrated by the following example which is given only for purposes of illustration and to which the invention is not limited. Chlorine and acrylonitrile are passed into a 35 mm. pyrex tube at the rate of 1.2 grams per minute of chlorine and 1.0 gram per minute of acrylonitrile. The tube is heated with an electric furnace so as to provide a temperature in the reaction zone of about 300° C. This temperature was recorded by a thermocouple placed in the bed of active carbon located in the tube at the exit end thereof. This carbon bed had a volume of about 100 cc. The exit gases were cooled to condense out the liquid products and this condensate was then distilled to separate a low boiling fraction, boiling below 100° C., from high boiling fractions boiling between 100–178° C. The high boiling fraction consisted of beta-chlorpropionitrile and alpha, alpha, beta-trichlorpropionitrile, these products thus being separated from the low boiling fraction containing the desired product. The low boiling fraction, consisting of unchanged acrylonitrile and alpha-chloracrylonitrile, was fractionated under reduced pressure in the presence of a polymerization inhibitor to separate the alpha-chloracrylonitrile from the unreacted acrylonitrile. The alpha-chloracrylonitrile, thus obtained, had a boiling point of 44–45° C. at 150 mm. pressure. Its density was $d_{28}$ 1.084 and the refractive index was $n_D^{25}$ 1.4268. The alpha-chloracrylonitrile obtained amounted to 40% on the basis of the reacted acrylonitrile.

It will be understood that the conditions described in the example may be varied without departing from the scope of the invention, the temperature and rate of flow of the gases being capable of considerable change. Also, the method of purification employed may be varied as may be found desirable.

While there has been described above the preferred embodiment of the invention, it will be apparent that various changes and modifications may be made therein without departing from the spirit of such invention. Accordingly, the invention is to be limited only by the appended claims in which it is intended to set forth all features of patentable novelty residing therein.

What I claim is:

1. A method of preparing alpha-chloracrylonitrile which comprises passing chlorine and acrylonitrile in vapor phase over active carbon at a temperature between about 200° and about 550° C., condensing the exit gases and fractionating to separate alpha-chloracrylonitrile.

2. A method of preparing alpha-chloracrylonitrile which comprises passing chlorine and acrylonitrile in vapor phase over active carbon at a temperature between about 200° and about 550° C., condensing the exit gases, distilling to separate a low boiling fraction from a high boiling fraction, fractionating the former under reduced pressure in the presence of a polymerization inhibitor and recovering alpha-chloracrylonitrile.

3. A method of preparing alpha-chloracrylonitrile which comprises passing chlorine and acrylonitrile in vapor phase over active carbon at a temperature between about 230° and about 450° C., condensing the exit gases, separating beta-chlorpropionitrile and alpha, alpha, beta-trichlorpropionitrile from the condensate and fractionating the remainder to remove unreacted acrylonitrile.

4. A method of preparing alpha-chloracrylonitrile which comprises passing chlorine and acrylonitrile in vapor phase over a contact catalyst at a temperature between about 200° and about 550° C., condensing the exit gases and fractionating to separate alpha-chloracrylonitrile.

JOHN R. LONG.